United States Patent
Li et al.

(10) Patent No.: US 9,677,544 B2
(45) Date of Patent: Jun. 13, 2017

(54) POWER PLANT GENERATION SYSTEM, METHOD FOR CONTROLLING WIND TURBINE GENERATORS, POWER PLANT CONTROLLER AND WIND TURBINE GENERATOR

(71) Applicant: VESTAS WIND SYSTEMS A/S, Aarhus N (DK)

(72) Inventors: Yishan Li, Singapore (SG); Chen Liu, Singapore (SG); Dinh Duc Nguyen, Singapore (SG); Liang Sun, Beijing (CN); Yi Zhou, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 52 days.

(21) Appl. No.: 14/647,930

(22) PCT Filed: Nov. 25, 2013

(86) PCT No.: PCT/DK2013/050398
§ 371 (c)(1),
(2) Date: May 28, 2015

(87) PCT Pub. No.: WO2014/082642
PCT Pub. Date: Jun. 5, 2014

(65) Prior Publication Data
US 2015/0322921 A1 Nov. 12, 2015

Related U.S. Application Data
(60) Provisional application No. 61/731,822, filed on Nov. 30, 2012.

(30) Foreign Application Priority Data
Nov. 30, 2012 (DK) .................................. 2012 70743

(51) Int. Cl.
*F03D 9/00* (2016.01)
*H02P 9/04* (2006.01)
(Continued)

(52) U.S. Cl.
CPC ............... *F03D 9/005* (2013.01); *F03D 7/04* (2013.01); *F03D 7/048* (2013.01); *H02J 3/38* (2013.01);
(Continued)

(58) Field of Classification Search
USPC ........................................ 290/44, 55; 307/84
See application file for complete search history.

(56) References Cited

U.S. PATENT DOCUMENTS

| 6,479,907 B1 | 11/2002 | Eriksson et al. |
| 7,346,462 B2 * | 3/2008 | Delmerico ......... G01R 19/2513 290/40 B |

(Continued)

FOREIGN PATENT DOCUMENTS

| DE | 102010056456 A1 | 6/2012 |
| WO | 2011/104270 A2 | 9/2011 |

OTHER PUBLICATIONS

International Search Report for PCT/DK2013/050398, Mar. 20, 2014.
Danish Search Report for PA 2012 70743, Jul. 16, 2013.

*Primary Examiner* — Pedro J Cuevas
(74) *Attorney, Agent, or Firm* — Patterson + Sheridan, LLP (57) ABSTRACT

According to an embodiment, a power generation system is provided comprising a wind power plant comprising a plurality of wind turbine generators and a power plant controller configured to signal, to at least a portion of the plurality of wind turbine generators, a voltage reference for the output voltage of the wind turbine generator wherein (Continued)

each wind turbine generator comprises a controller configured to control the wind turbine generator based on the voltage reference.

11 Claims, 10 Drawing Sheets

(51) Int. Cl.
  *F03D 7/04* (2006.01)
  *H02J 3/38* (2006.01)
  *H02J 1/00* (2006.01)
(52) U.S. Cl.
  CPC ............ *H02J 3/386* (2013.01); *Y02E 10/723* (2013.01); *Y02E 10/763* (2013.01)

(56) References Cited

U.S. PATENT DOCUMENTS

| | | | | |
|---|---|---|---|---|
| 7,505,833 | B2* | 3/2009 | Delmerico | H02J 3/16 700/291 |
| 7,528,496 | B2* | 5/2009 | Fortmann | F03D 7/0264 290/44 |
| 7,839,024 | B2* | 11/2010 | Cardinal | F03D 7/0284 307/153 |
| 7,979,167 | B2* | 7/2011 | Delmerico | H02J 3/16 700/291 |
| 8,239,702 | B2* | 8/2012 | Bengtson | F03D 7/047 713/375 |
| 8,248,039 | B2* | 8/2012 | Cao | F03D 7/0272 290/44 |
| 8,692,419 | B2* | 4/2014 | Fortmann | F03D 9/003 307/153 |
| 8,861,154 | B2* | 10/2014 | Witte | H02H 3/063 361/71 |
| 8,928,165 | B2* | 1/2015 | Vasak | G01R 31/42 290/44 |
| 9,046,077 | B2* | 6/2015 | Kirchner | F03D 7/0284 |
| 9,306,391 | B2* | 4/2016 | Chaudhuri | H02J 1/00 |
| 9,379,534 | B2* | 6/2016 | Witte | H02H 3/093 |
| 2006/0255594 | A1 | 11/2006 | Larsen | |
| 2007/0085343 | A1* | 4/2007 | Fortmann | F03D 7/0264 290/44 |
| 2007/0228838 | A1* | 10/2007 | Delmerico | H02J 3/16 307/84 |
| 2007/0299548 | A1* | 12/2007 | Weitkamp | F03D 7/046 700/52 |
| 2009/0177333 | A1* | 7/2009 | Delmerico | H02J 3/16 700/297 |
| 2010/0207463 | A1* | 8/2010 | Fortmann | F03D 9/003 307/153 |
| 2010/0305767 | A1* | 12/2010 | Bengtson | F03D 7/047 700/287 |
| 2010/0327585 | A1* | 12/2010 | Cao | F03D 7/0272 290/44 |
| 2011/0313591 | A1 | 12/2011 | Andresen et al. | |
| 2012/0327545 | A1* | 12/2012 | Witte | H02H 3/063 361/92 |
| 2013/0328309 | A1* | 12/2013 | Fujii | F03D 7/0272 290/44 |
| 2014/0085763 | A1* | 3/2014 | Varma | H02H 3/08 361/93.1 |
| 2014/0225369 | A1* | 8/2014 | Bodewes | F03D 7/04 290/44 |
| 2014/0229153 | A1* | 8/2014 | Grastein | G06F 17/5009 703/18 |
| 2014/0246855 | A1* | 9/2014 | Vasak | G01R 31/42 290/44 |
| 2014/0265583 | A1* | 9/2014 | Chaudhuri | H02J 13/0086 307/52 |
| 2014/0277804 | A1* | 9/2014 | Witte | H02H 3/06 700/293 |
| 2015/0042092 | A1* | 2/2015 | Nelson | H02J 3/386 290/44 |
| 2016/0276830 | A1* | 9/2016 | Nasirian | H02J 3/18 |

* cited by examiner

POWER PLANT GENERATION SYSTEM, METHOD FOR CONTROLLING WIND TURBINE GENERATORS, POWER PLANT CONTROLLER AND WIND TURBINE GENERATOR

FIELD OF THE INVENTION

The present invention relates to power plant generation systems, methods for controlling wind turbine generators, power plant controllers and wind turbine generators.

BACKGROUND

In a wind power plant comprising a plurality of wind turbine generators, a disturbance may cause the output voltages of the wind turbine generators to oscillate in an unacceptable dimension. Controlling schemes that allow stabilizing the output voltages within a short amount of time are desirable.

SUMMARY OF THE INVENTION

According to an embodiment, a power generation system is provided comprising a wind power plant comprising a plurality of wind turbine generators and a power plant controller configured to signal, to at least a portion of the plurality of wind turbine generators, a voltage reference for the output voltage of the wind turbine generator wherein each wind turbine generator comprises a controller configured to control the wind turbine generator based on the voltage reference.

According to one embodiment, the power plant controller comprises a determiner configured to determine the voltage reference for each of the wind turbine generators.

According to one embodiment, the determiner is configured to individually determine a voltage reference for each of the wind turbine generators.

According to one embodiment, the determiner is configured to determine the voltage reference for each of the wind turbine generators based on a location of the wind turbine generator.

According to one embodiment, the determiner is configured to determine the voltage reference for each of the wind turbine generators based on a location of the wind turbine generator within the wind power plant.

According to one embodiment, the determiner is configured to determine the voltage reference in response to a (e.g. small) disturbance in the wind power plant and is configured to determine the voltage reference for each of the wind turbine generators based on a location of the wind turbine generator with respect to a location of the (e.g. small) disturbance.

According to one embodiment, the determiner is configured to determine the voltage reference based on a reactive power reference.

According to one embodiment, the power plant controller is further configured to signal, to at least a portion of the plurality of wind turbine generators, an active power reference for the active power output by the wind turbine generator and wherein the controller of each wind turbine generator is further configured to control the wind turbine generator in accordance with the active power reference.

According to one embodiment, the controller of each wind turbine generator is configured to control its output voltage in accordance with the reference voltage.

According to one embodiment, the controller of each wind turbine generator is configured to close-loop control its output voltage in accordance with the reference voltage.

According to one embodiment, the controller of each wind turbine generator is configured to control the wind turbine generator by controlling the stator voltage of the wind turbine generator based on the voltage reference.

According to one embodiment, the controller of each wind turbine generator is configured to control the wind turbine generator independent from the reactive power output by the wind turbine generator.

According to one embodiment, the controller of each wind turbine generator is configured to control the wind turbine generator independent from a reactive power reference.

According to other embodiment, a method for controlling wind turbine generators, a power plant controller and a wind turbine generator corresponding to the power generation system described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention.

In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
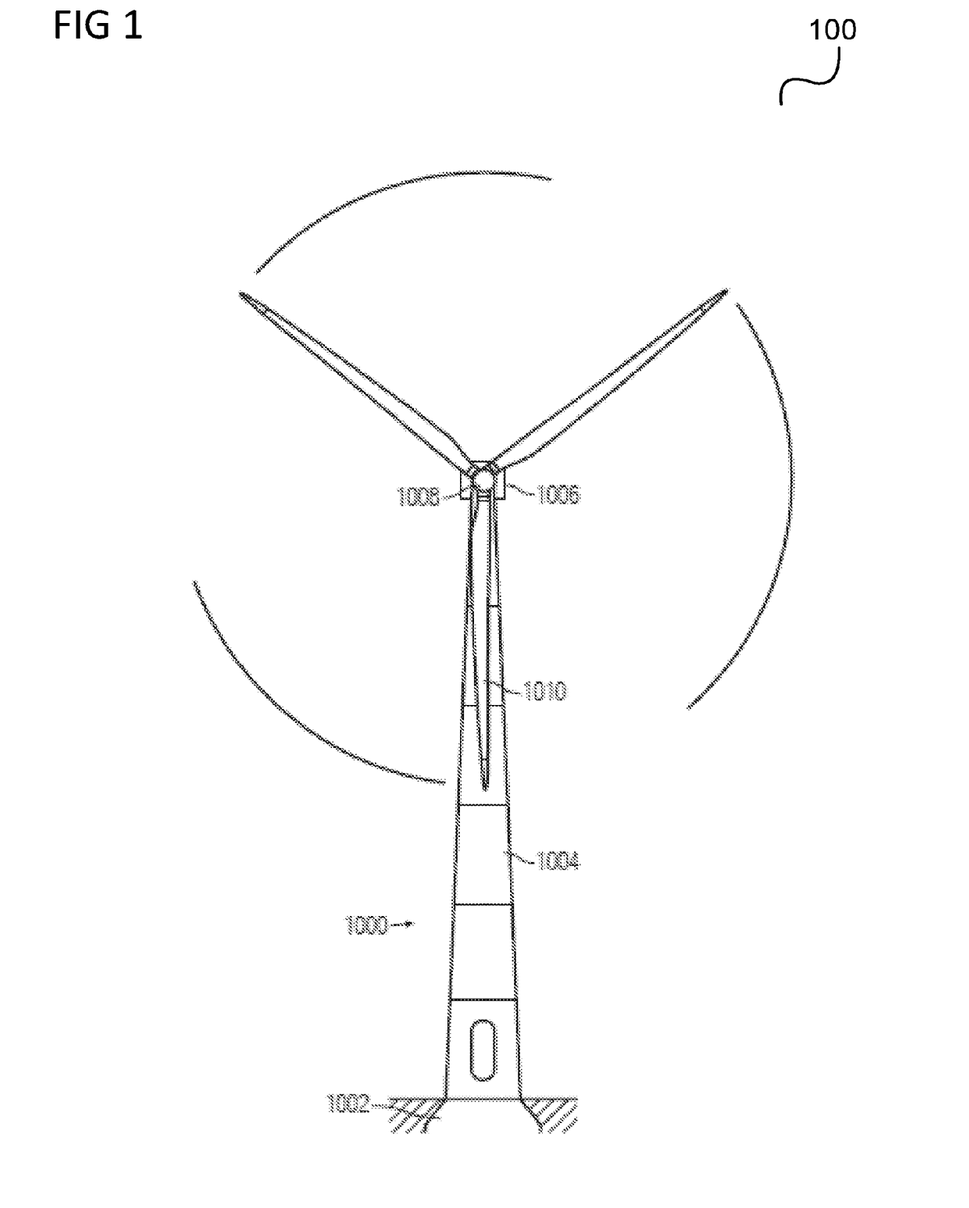
FIG. 1 illustrates a common setup of a wind turbine.

FIG. 1 illustrates a common setup of a wind turbine 100 which may use the embodiments as described below. The wind turbine 100 is mounted on a base 1002. The wind turbine 100 includes a tower 1004 having a number of tower sections. A wind turbine nacelle 1006 is placed on top of the tower 1004. The wind turbine rotor includes a hub 1008 and at least one rotor blade 1010, e.g. three rotor blades 1010. The rotor blades 1010 are connected to the hub 1008 which in turn is connected to the nacelle 1006 through a low speed shaft which extends out of the front of the nacelle 1006.

Figure 2:
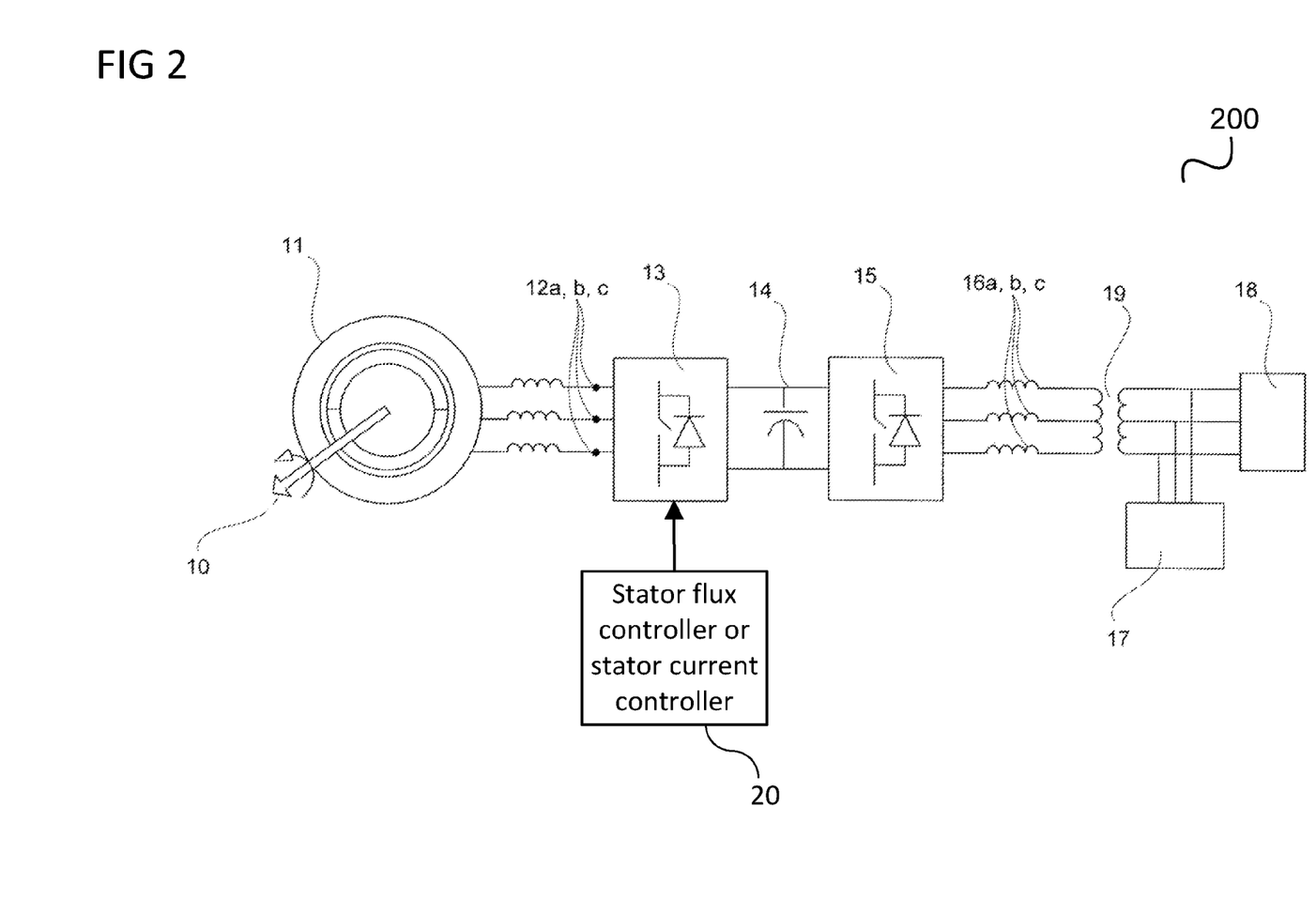
FIG. 2 illustrates an example of power generation system according to an embodiment.

FIG. 2 illustrates an example of power generation system 200 according to an embodiment.

A shaft 10 transfers mechanical energy from an energy source, for example the at least one rotor blade 1010 shown in FIG. 1, to a rotor of a variable speed generator 11. The shaft 10 is connected to the at least one rotor blade 1010 and is for example connected to the rotor via a gearbox in order to adapt the rotational speed of the shaft 10 (i.e. the speed of the wind turbine blades) to a speed range suitable for the generator 11. The generator 11 converts the mechanical energy provided via the shaft 10 into electrical energy and delivers the electrical energy at a set of stator terminals 12a, 12b, 12c. The generator 11 is in this example an interior permanent magnet (IPM) generator. The rotational speed of the shaft 10 varies as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c varies in accordance with the rotational speed of the shaft 10. The terminals 12a, 12b, 12c of the generator 11 are connected to a generator side power converter 13.

The converter 13 for example comprises a set of switches in the form of, for example, MOSFETs, GTOs, IGBTs or BJTs.

The converter 13 functions, under normal operation, as an active rectifier converting the variable frequency AC voltage provided by the generator 11 into a DC voltage. The conversion may be controlled using a pulse width modulation (PWM) scheme, wherein control signals are applied to the switches of the converter 13 in order to provide the desired conversion functionality. In one embodiment, the switches are controlled by employing a space vector pulse width modulation scheme.

For a given speed of operation (i.e. a given rotor rotation speed), the electromagnetic power depends on the magnitude of the stator flux vector or stator current vector and its location with respect to the rotor flux vector. If the position of the rotor flux vector or stator current vector is known, it is possible to apply a voltage to the stator that positions the stator flux vector or stator current vector to give the desired magnitude of the power at a given rotational speed. Hence, by controlling the stator flux vector or stator current vector, the electromagnetic power, which corresponds to the power given to the load, can be obtained as desired.

The stator flux vector or stator current vector may for example be controlled by a suitable control of the generator side power converter 13. Accordingly, in one embodiment, the power generation system 200 includes a stator flux controller or stator current controller 20 which controls the generator side power converter 13 such that the power supplied by the electrical generator 11 to the power grid 18 has a desired magnitude.

The output of the converter 13 is connected to a DC link 14 which comprises a link capacitor for reducing the voltage ripple on the DC link.

The DC link 14 is connected to a grid side power converter 15. The topology of the grid side power converter 15 may be similar to the generator side power converter 13. The grid side power converter 15 for example normally operates as an inverter for converting the DC voltage on the DC link 14 into a regulated AC voltage for feeding active and reactive power to a power grid 18.

The output of the grid side power converter 15 may be filtered by means of inductors 16a, 16b, and 16c in order to, for example, remove high order harmonics from the output power signal. The output power signal may, if needed, be filtered by a harmonic filter 17 in order to keep the interference or harmonic distortion at a low value. The output power signal is then provided to the power grid 18 via a transformer 19.

Figure 3:
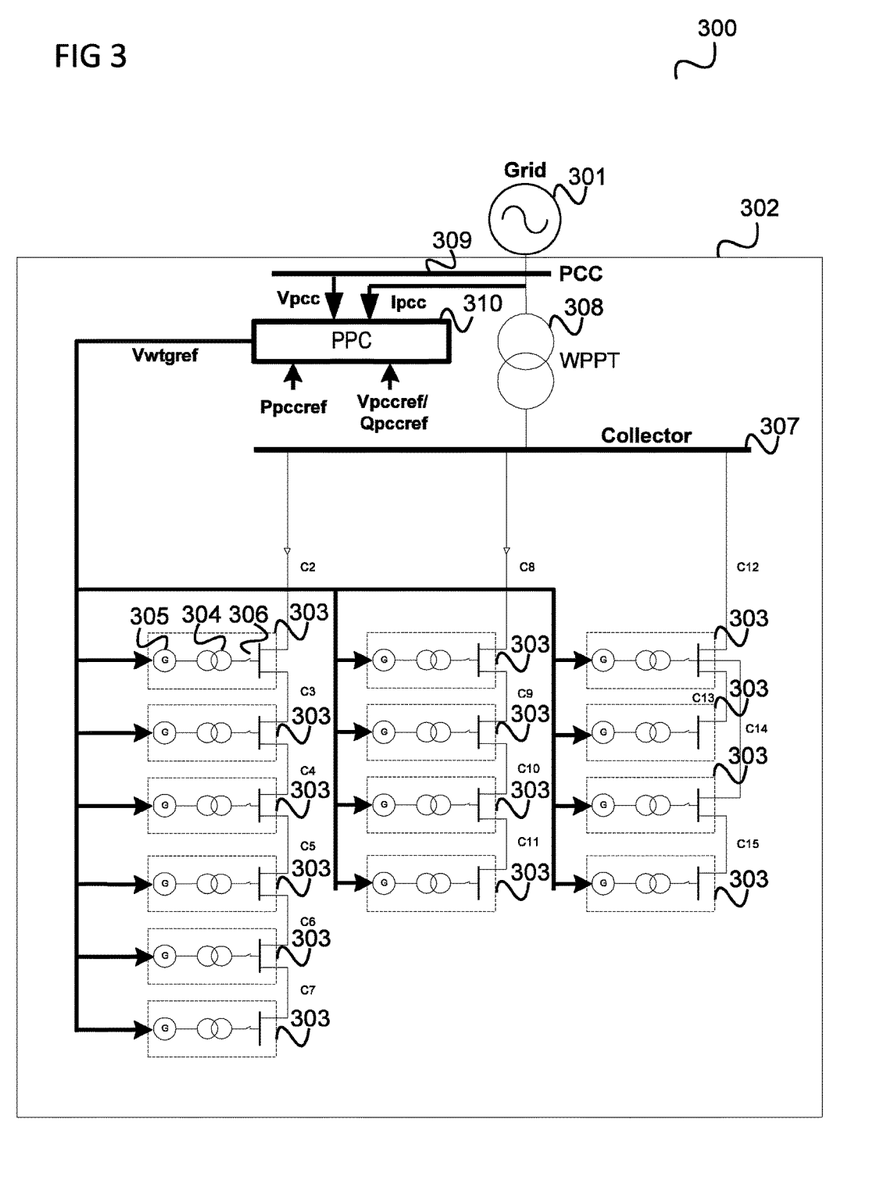
FIG. 3 shows a power generation system according to an embodiment.

The wind turbine 100 and the power generation system 200 may be part of a power generation system including a plurality of wind turbines. This is illustrated in FIG. 3. FIG. 3 shows a power generation system 300 according to an embodiment.

The power generation system 300 includes a grid 301 for example corresponding to the grid 18 and a wind power plant 302. The wind power plant comprises a plurality of wind turbine generators 303 for example corresponding to the wind turbine 100 and the power generation system 200 without the grid 18. Specifically, each wind turbine generator 303 comprises a generator connection transformer 304 e.g. corresponding to the transformer 19 and each wind turbine generator 303 comprises a generator 305, e.g. corresponding to the components of the power generation system 200 on the generator side up to the transformer 19. Each wind turbine generator 303 further comprises a switch 306 via which it may be coupled to or decoupled from a collector bus 307 which collects the power generated by the wind turbine generators 303.

The collector bus 307 is coupled via a wind power plant transformer 308 to a point of common coupling (PCC) 309 which is coupled to the grid 301. (Reference signs 304, 305, 306 are only exemplarily shown for one of the wind turbine generators 303.) The wind power plant further comprises a power plant controller 310 which may be supplied with a reference for the voltage at the PCC 309 Vpccref, a reference for the reactive power at the PCC 309 Qpccref, i.e. a reference for the reactive power to be supplied by the wind power plant 302 and/or a reference for the active power at the PCC 309 Ppccref, i.e. a reference for the active power to be supplied by the wind power plant 302.

In the following, an example for the operation of the PPC is described with reference to FIG. 4.

Figure 4:
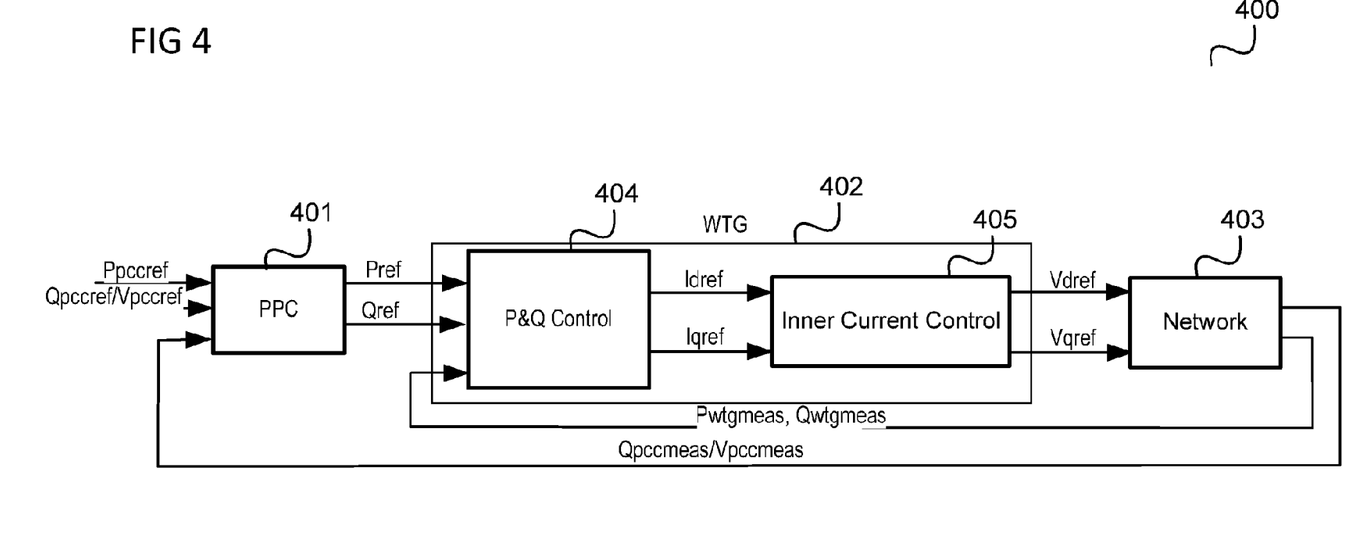
FIG. 4 shows a control arrangement.

FIG. 4 shows a control arrangement 400.

The control arrangement 400 comprises a PPC 401 corresponding to PPC 310, a wind turbine generator controller 402, for example corresponding to the controller 20 of one of the wind turbine generators 303 and an internal network 403 corresponding to the generator 305 and the connection architecture of the generator 305 to the grid 301 for the power flow.

In this example, the PPC 401 receives a reference for the active power at the PCC 309 Ppccref and a reference for the voltage at the PCC 309 Vpccref and/or a reference for the reactive power at the PCC 309 Qpccref. Further, the PPC 401 receives the reactive power measured at the PCC 309 Qpccmeas and/or the voltage measured at the PCC 309 Vpccmeas.

From this information, the PPC 401 generates an active power reference Pref and a reactive power reference Qref and supplies these to the wind turbine generator controller 402.

The wind turbine generator controller 402 further receives the measured active power Pwtgmeas and the measured reactive power Qwtgmeas as output by the generator 305. The wind turbine generator controller 402 may further receive the measured voltage at the output of the generator 305 Vwtgmeas.

Based on this information, the wind turbine generator controller 402 controls the generator 305, e.g. by setting the d axis stator reference voltage and the q axis stator reference voltage for the generator.

In the example shown in FIG. 4, the wind turbine generator controller 402 includes an active power and reactive power (P&Q) controller 404 generating a d axis stator current reference and a q axis stator current reference and an inner current control module 405 receiving the d axis stator current reference and the q axis stator current reference and generating the d axis stator reference voltage and the q axis stator reference voltage for the generator based on this input.

Alternatively, the wind turbine generator controller 402 may comprise a PI controller (not shown) generating a reference for the voltage at the output of the generator 305 from the reactive power reference and an active power and voltage (P&V) controller which generates the d axis stator current reference and the q axis stator current reference from the active power reference, a reference for the voltage at the output of the generator 305, the measured active power Pwtgmeas output by the generator and the measured voltage at the output of the generator 305.

The PI controller can be seen as realizing an outer reactive power control loop which determines the voltage reference for the wind turbine generator inner controller.

In a weak grid connection a small disturbance occurring in the grid 301 can make the generator terminal voltage (i.e. at the terminals of the generators 305) oscillate in an unacceptable dimension. A controlling scheme as described with reference to FIG. 4 may not be able to handle this situation.

For example, after a large disturbance (FRT: Fault Ride Through), a coordinated FRT strategy between the 401 PPC and the wind turbine generator (WTG) controller 402 may force the PPC to be frozen until all WTGs 303 are out of their FRT modes.

However, the WTGs 303 typically do not step out of their FRT modes simultaneously. The WTGs farthest to the fault location typically step out of FRT mode early and those close to the fault location typically step out later. Those WTGs 303 which step out of the FRT modes early do not receive the reactive power reference Qref from the PPC 401 because the PPC 401 is still frozen during that period. Thus these WTGs 303 control their reactive power based on a pre-fault reactive power setting. However, the grid impedance may be changed if the transmission system is reconfigured. As a consequence, the original reactive power reference may not be appropriate for the new operating point.

As a consequence of the above, the wind power plant and the wind turbine generators may experience very large voltage oscillation and become unstable and retrigger the FRT modes continuously.

Figure 5:
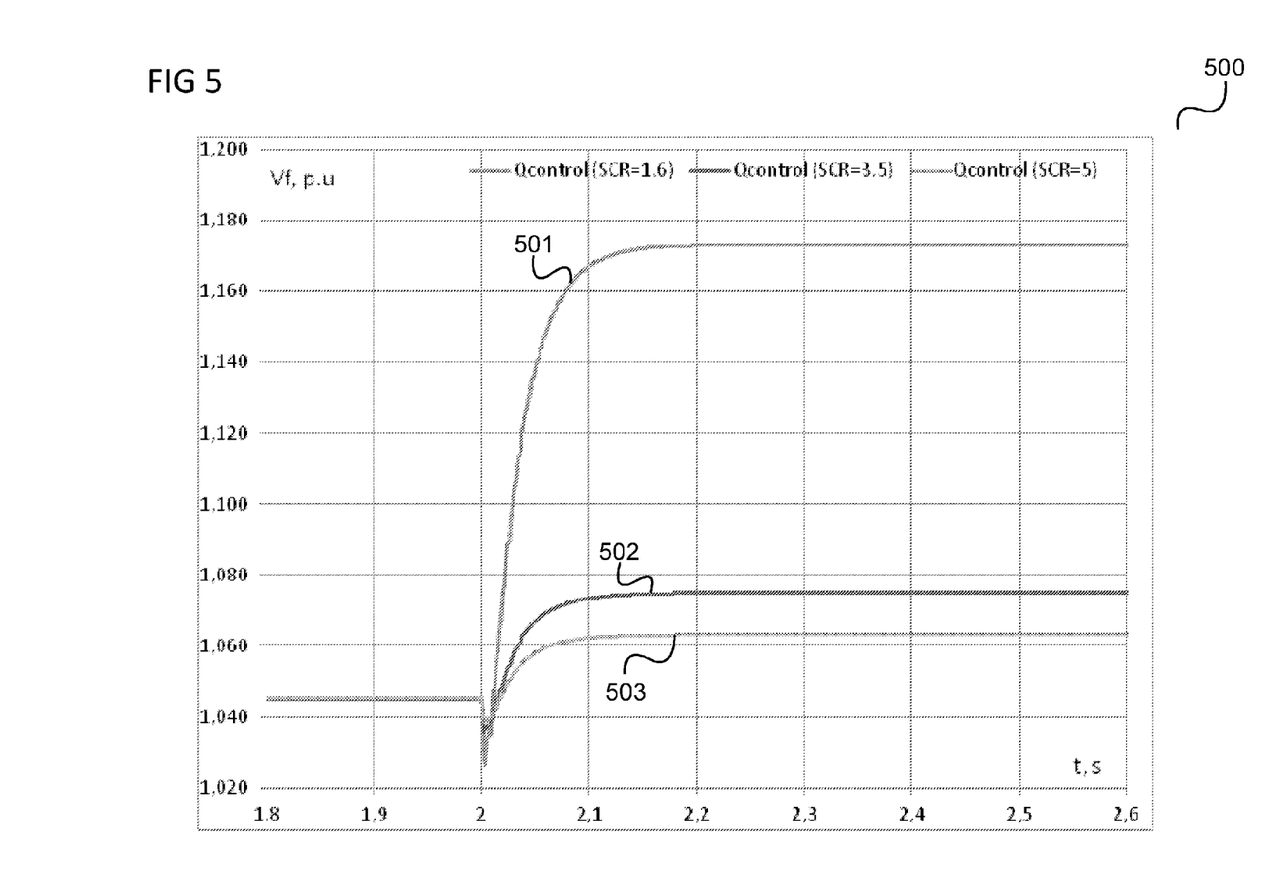
FIG. 5 shows a voltage diagram.

An example for a behavior of a wind turbine generator is shown in FIG. 5.

FIG. 5 shows a voltage diagram 500.

The voltage diagram 500 shows the voltage (in p.u.) over time at the low voltage side (i.e. the generator side) of the generator connection transformer 304 of a wind turbine generator 303. A first graph 501 shows the voltage for an SCR (short circuit ratio) of 1.6, a second graph 502 shows the voltage for an SCR (short circuit ratio) of 3.5 and a third graph 503 shows the voltage for an SCR (short circuit ratio) of 5.0. The example is based on a ratio of inductivity to resistance of the grid 301 of 10.

In this example, a disturbance at time t=2 leads to persistent overvoltages which may for example be caused by a reactive power reference not being appropriate for the post-disturbance condition.

Possible disturbances that can lead a WTG with reactive power controller and current slow PPC voltage controller into voltage instability in a weak grid connection are 1. when the grid load is suddenly connected or disconnected
2. when a fault has happened in the external grid and a voltage dip follows up in the wind power plant network. During the fault recovery period, it may be difficult to coordinate between the PPC and the WTG.
3. when grid impedance is decreased after fault clearances.

Under these conditions, the pre-disturbance reactive power reference for WTG may be improper for the post-disturbance condition. As a consequence, the PPC 401 may not be fast enough to react and the WTG reactive power controller 402 cannot receive a correct reactive power reference. Finally a voltage instability may occur, and the WTG/WPP may enter FRT modes continuously.

According to one embodiment, the issues described above are addressed by a local fast WTG voltage controller together with a proper coordination with the PPC voltage/reactive power controller.

Figure 6:
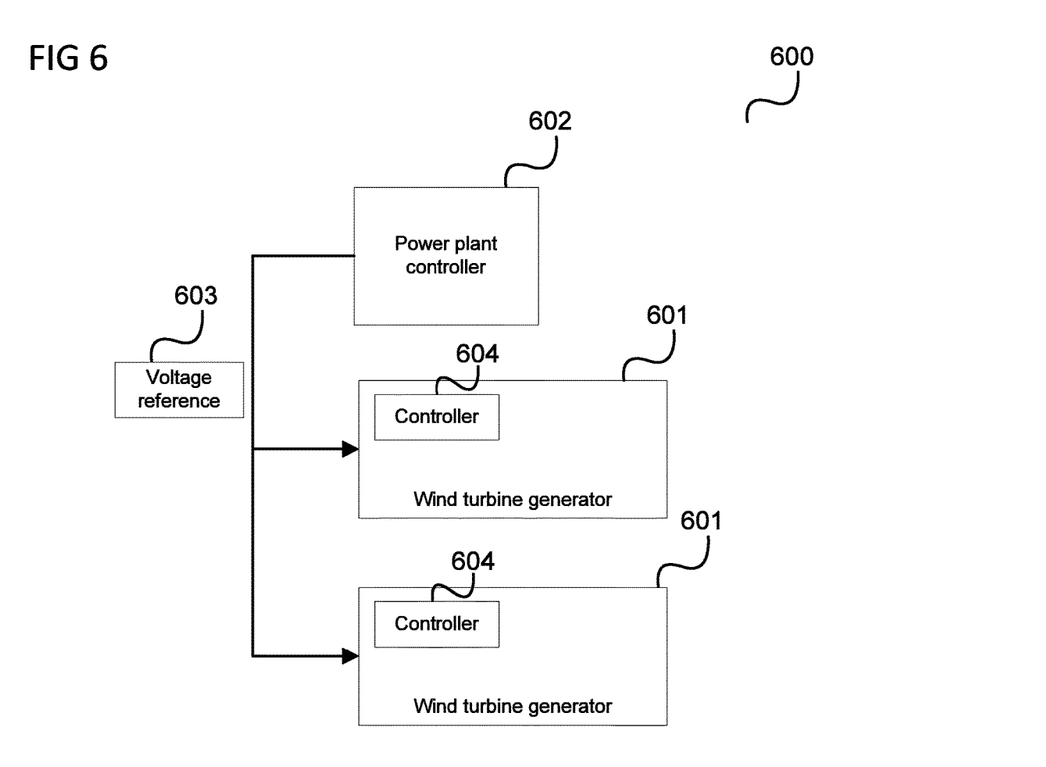
FIG. 6 shows a power generation system according to an embodiment.

FIG. 6 shows a power generation system 600 according to an embodiment.

The power generation system 600 comprises a wind power plant comprising a plurality of wind turbine generators 601.

The power generation system 600 comprises a power plant controller 602 configured to signal, to at least a portion of the plurality of wind turbine generators 601 (e.g. to each of the wind turbine generators), a voltage reference 603 for the output voltage of the wind turbine generator 601.

Each wind turbine generator comprises a controller 604 configured to control the wind turbine generator based on the voltage reference.

Thus, according to one embodiment, a power plant controller of a wind power plant sends a voltage reference (i.e. an wind turbine generator output voltage reference) to the wind turbine generators of the wind power plant. In other words, the wind turbine generators are controlled by the power plant controller based on an output voltage reference instead of, for example, a reactive power reference as in the control arrangement 400 described above with reference to FIG. 4.

Embodiments allow ensuring the voltage stability in the wind power plant even when connected to a weak external grid. Further, embodiments allow reducing the size of additional reactive power compensation and thus allow reducing costs.

The various components of the power generation system such as the power plant controller, the determiner, the wind turbine generator controller etc. may for example be implemented by one or more circuits. A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g.

any kind of computer program, e.g. a computer program using a virtual machine code such as e.g. Java.

The power plant controller for example comprises a determiner configured to determine the voltage reference for each of the wind turbine generators.

The determiner is for example configured to individually determine a voltage reference for each of the wind turbine generators.

The determiner is for example configured to determine the voltage reference for each of the wind turbine generators based on a location of the wind turbine generator.

For example, the determiner is configured to determine the voltage reference for each of the wind turbine generators based on a location of the wind turbine generator within the wind power plant.

The determiner may be configured to determine the voltage reference in response to a (e.g. small) disturbance in the wind power plant and is configured to determine the voltage reference for each of the wind turbine generators based on a location of the wind turbine generator with respect to a location of the (e.g. small) disturbance.

The determiner may be configured to determine the voltage reference based on a reactive power reference.

In one embodiment, the power plant controller is further configured to signal, to at least a portion of the plurality of wind turbine generators, an active power reference for the active power output by the wind turbine generator and wherein the controller of each wind turbine generator is further configured to control the wind turbine generator in accordance with the active power reference.

The controller of each wind turbine generator is for example configured to control its output voltage in accordance with the reference voltage.

For example, the controller of each wind turbine generator is configured to close-loop control its output voltage in accordance with the reference voltage.

In one embodiment, the controller of each wind turbine generator is configured to control the wind turbine generator by controlling the stator voltage of the wind turbine generator based on the voltage reference.

The controller of each wind turbine generator is for example configured to control the wind turbine generator independent from the reactive power output by the wind turbine generator. In other words, the controller for example does not receive the reactive power output by the wind turbine generator as input for the control procedure.

The controller of each wind turbine generator is for example configured to control the wind turbine generator independent from a reactive power reference.

Figure 7:
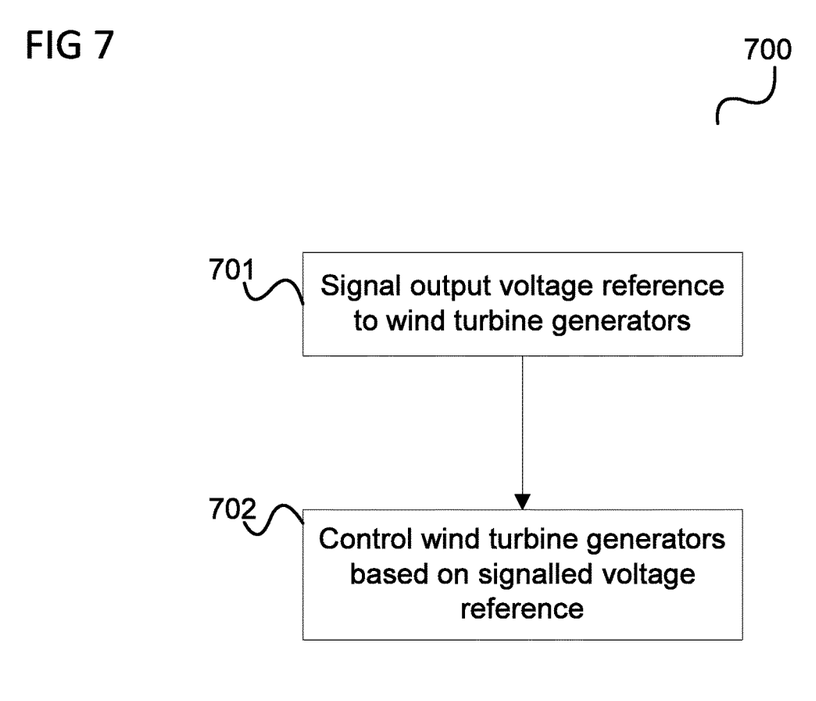
FIG. 7 shows a flow diagram.

The power generation system 600 for example carries out a method as illustrated in FIG. 7.

FIG. 7 shows a flow diagram 700.

The flow diagram 700 illustrates a method for controlling wind turbine generators.

In 701, to at least a portion of the plurality of wind turbine generators of a plurality of wind turbine generators of a wind power plant, a voltage reference for the output voltage of the wind turbine generator is signaled.

In 702, each wind turbine generator is controlled based on the voltage reference signaled to the wind turbine generator.

According to other embodiment, a power plant controller and a wind turbine generator corresponding to the power generation system described with reference to FIG. 6 are provided. It should be noted that embodiments described in context of the power generation system are analogously valid for the method described with reference to FIG. 7, the power plant controller and the wind turbine generator and vice versa.

In the following, a control scheme for a wind power plant is described in more detail.

Figure 8:
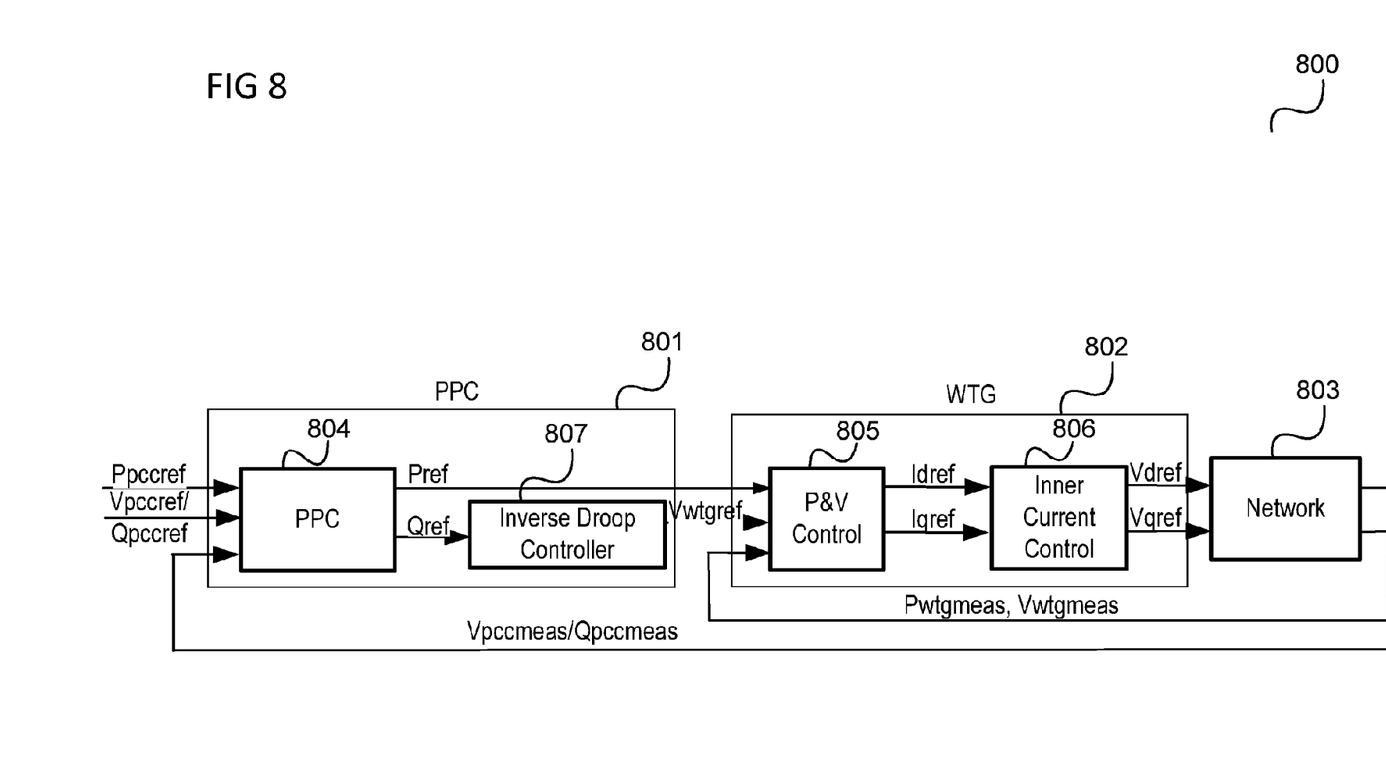
FIG. 8 shows a control arrangement according to an embodiment.

FIG. 8 shows a control arrangement 800 according to an embodiment.

The control arrangement 800 comprises a PPC 801 corresponding to PPC 310, a wind turbine generator controller 802, for example corresponding to the controller 20 of one of the wind turbine generators 303 and an internal network 803 corresponding to the generator 305 and the connection architecture of the generator 305 to the grid 301 for the power flow.

In this example, the PPC 801 receives a reference for the active power at the PCC 309 Ppccref and a reference for the voltage at the PCC 309 Vpccref or a reference for the reactive power at the PCC 309 Qpccref. Further, the PPC 801 receives the voltage measured at the PCC 309Vpccmeas or the measured reactive power at the PCC 309Qpccmeas, respectively.

The PPC 801 comprises a power controller 804 which generates an active power reference Pref and a reactive power reference Qref from the information received by the PPC 801. The PPC 801 further comprises an inverse droop controller 807 which is supplied with the reactive power reference Qref and generates a voltage reference (i.e. a wind turbine generator output voltage reference) Vwtgref. The active power reference and the voltage reference are communicated to the wind turbine generator controller 802. The wind turbine generator controller 802 further receives the measured active power Pwtgmeas and the measured the measured voltage Vwtgmeas at the output of the generator 305.

The wind turbine generator controller 802 includes a P&V controller 805 generating a d axis stator current reference and a q axis stator current reference based on the received information. The wind turbine generator controller 802 further includes an inner current control module 806 receiving the d axis stator current reference and the q axis stator current reference and generating the d axis stator reference voltage and the q axis stator reference voltage for the generator based on this input.

The P&V controller 805 may for example determine the d axis stator current reference $I_{d,ref}$ and the q axis stator current reference $I_{q,ref}$ according to the following:

$$I_{d,ref} = \left(k_{p,id} + \frac{k_{i,id}}{s}\right)(V_{wtgref} - V_{wtgmeas})$$

$$I_{q,ref} = \left(k_{p,iq} + \frac{k_{i,iq}}{s}\right)(V_{DCref}^2 - V_{DCmeas}^2)$$

where $k_{p,id}$ (proportional gain), $k_{i,id}$ (integrator gain), $k_{p,iq}$ (proportional gain) and $k_{i,iq}$ (integrator gain) are control parameters and 1/s represents integration (complex-s domain). $VDC_{ref}$ is a reference voltage for the DC link 14 and $VDC_{meas}$ is the measured voltage of the DC link 14.

The inner current control module 806 for example determines the d axis stator reference voltage $V_{d,ref}$ and the q axis stator reference voltage $V_{q,ref}$ according to the following:

$$V_{d,ref} = \left(k_{p,vd} + \frac{k_{i,vd}}{s}\right)(I_{d,ref} - I_{d,meas}) + V_{d,meas} - L\omega I_{q,meas}$$

$$V_{q,ref} = \left(k_{p,vq} + \frac{k_{i,vq}}{s}\right)(I_{q,ref} - I_{q,meas}) + V_{q,meas} + L\omega I_{d,meas}$$

where $k_{p,vd}$ (proportional gain), $k_{i,vd}$ (integrator gain), $k_{p,vq}$ (proportional gain), $k_{i,vq}$ (integrator gain) are control parameters, 1/s represents integration (complex-s domain) L is the inductance of the filter between the generator 11 and the stator terminals 12a, 12b, 12c and ω is the frequency of the stator current.

The inverse droop controller 807 for example determines the voltage reference $V_{wtgref}$ for example such that $$V_{wtgref} - V_{ref,0} = k_{droop}(Q_{ref} - Q_{ref,0})$$

where
$V_{ref,0}$ is the internal WTG voltage reference setpoint, $Q_{ref,0}$ is the internal WTG reactive power reference setpoint. These two parameters may for example be estimated based on the power flow study.

The PPC 804 for example determines the reactive power reference $Q_{ref}$ according to the following:

$$Q_{ref} = \left(k_{p,Qpcc} + \frac{k_{i,Qpcc}}{s}\right)(V_{pcc,ref} - V_{pcc,meas})$$

where $k_{p,Qpcc}$ (proportional gain) and $k_{i,Qpcc}$ (integrator gain) are control parameters and 1/s represents integration (complex-s domain).

It should be noted that in this embodiment, the wind turbine generator controller does not have an outer reactive power control loop, in contrast to the control arrangement 400 described with reference to FIG. 4.

In the power generation system 300, the PPC 310, i.e. a controller on wind power plant (i.e. wind farm) level may send the voltage reference to each WTG 303.

In the example of FIG. 8, each wind turbine generator 303 may be supplied with the same voltage reference. In the following, an embodiment is described in which each wind turbine generator 303 is supplied with an individual voltage reference.

Figure 9:
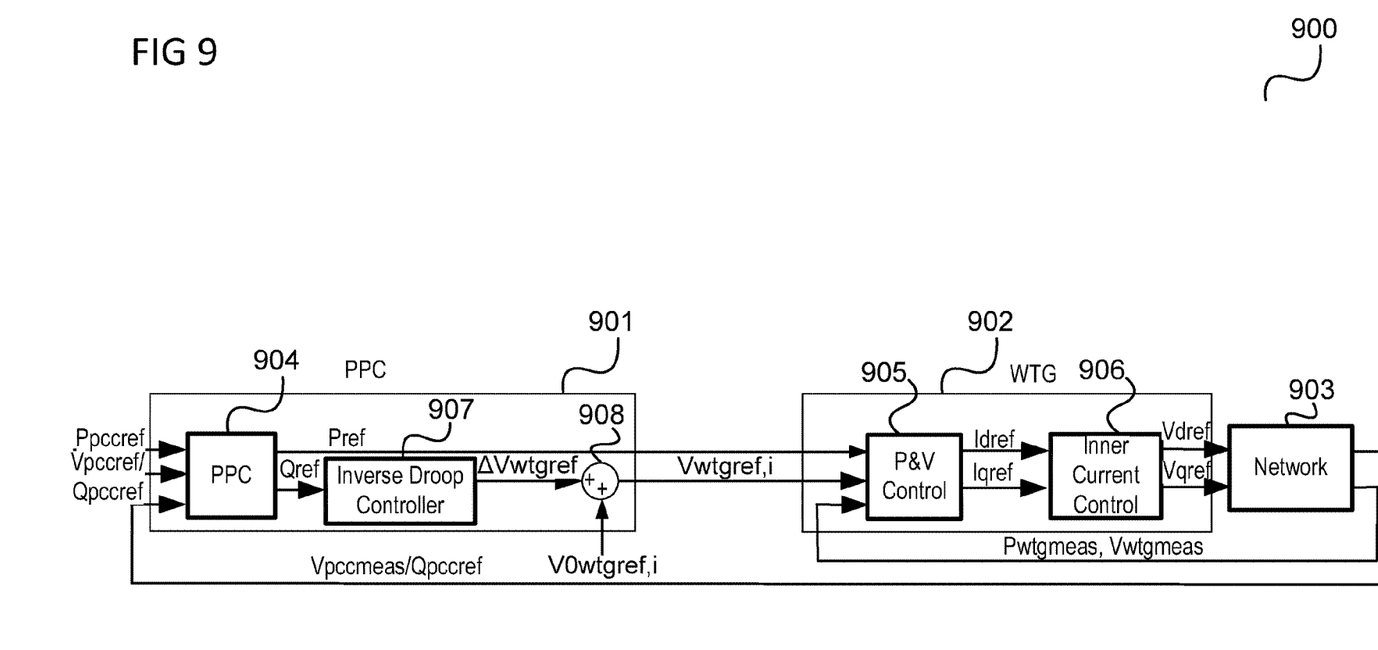
FIG. 9 shows a control arrangement according to an embodiment.

FIG. 9 shows a control arrangement 900 according to an embodiment.

Similarly to the control arrangement 800, the control arrangement 900 comprises a PPC 901 corresponding to PPC 310, a wind turbine generator controller 902, for example corresponding to the controller 20 of one of the wind turbine generators 303 and an internal network 903 corresponding to the generator 305 and the connection architecture of the generator 305 to the grid 301 for the power flow.

The PPC 901 receives a reference for the active power at the PCC 309 Ppccref. Further, the PPC 901 receives a reference for the voltage at the PCC 309 Vpccref and the voltage measured at the PCC 309 Vpccmeas. Alternatively, the PPC 901 further receives a reference for the reactive power at the PCC 309 Qpccref and the measured reactive power output by the wind turbine generator Qpccmeas.

The PPC 901 comprises a power controller which generates an active power reference Pref and a reactive power reference Qref from the information received by the PPC 901. The PPC 901 further comprises an inverse droop controller 907 which is supplied with the reactive power reference Qref and generates a voltage reference (i.e. a wind turbine generator output voltage reference) increment ΔVwtgref. Further, the PPC 901 comprises an adder 908 configured to add an individual base voltage reference V0wtgref,i to the voltage reference increment ΔVwtgref to generate an individual voltage reference Vwtgref,i.

The individual base voltage reference V0wtgref,i is for example determined for a wind turbine generator (with index i) 303 based on its location in the wind power plant 302, e.g. based on a minimum total active power loss criterion. With equal voltage references for the WTGs 303 it may happen that one WTG 303 injects reactive power while another absorbs reactive power which may result in a decrease of the total WPP reactive power capability at the PCC 309. Further, the total WPP active power loss may not be minimal since the power flow within WPP is not minimized.

The active power reference and the individual voltage reference are communicated to the wind turbine generator controller 902.

The wind turbine generator controller 902 further receives the measured active power Pwtgmeas and the measured the measured voltage at the output of the generator 305 Vwtgmeas.

The wind turbine generator controller 902 includes a P&V controller 905 generating a d axis stator current reference and a q axis stator current reference based on the received information. The wind turbine generator controller 902 further includes an inner current control module 906 receiving the d axis stator current reference and the q axis stator current reference and generating the d axis stator reference voltage and the q axis stator reference voltage for the generator based on this input.

In an alternative embodiment, the inverse droop controller 907 and the adder 908 may be omitted from the PPC 901 and the wind turbine generator controller 902 may include functionally equivalent elements. Thus, for example, the reactive power reference Qref is fed to a PI controller (not shown) in the wind turbine generator controller 902, the PI controller generates a wind turbine generator output voltage reference increment (corresponding to ΔVwtgref) and an adder (not shown) in the wind turbine generator controller 902 adds an individual base voltage reference (corresponding to V0wtgref,i) to the voltage reference increment to generate an individual voltage reference (corresponding to Vwtgref,i). The P&V controller 905 generates the d axis stator current reference and the q axis stator current reference based on the individual voltage reference, the active power reference Pref, and the measured active power Pwtgmeas and the measured voltage Vwtgmeas output by the generator 305.

In the following, the handling of (e.g. small) disturbances by a controlling scheme according to an embodiment, for example the controlling schemes as described with reference to FIGS. 8 and 9 are illustrated.

Figure 10:
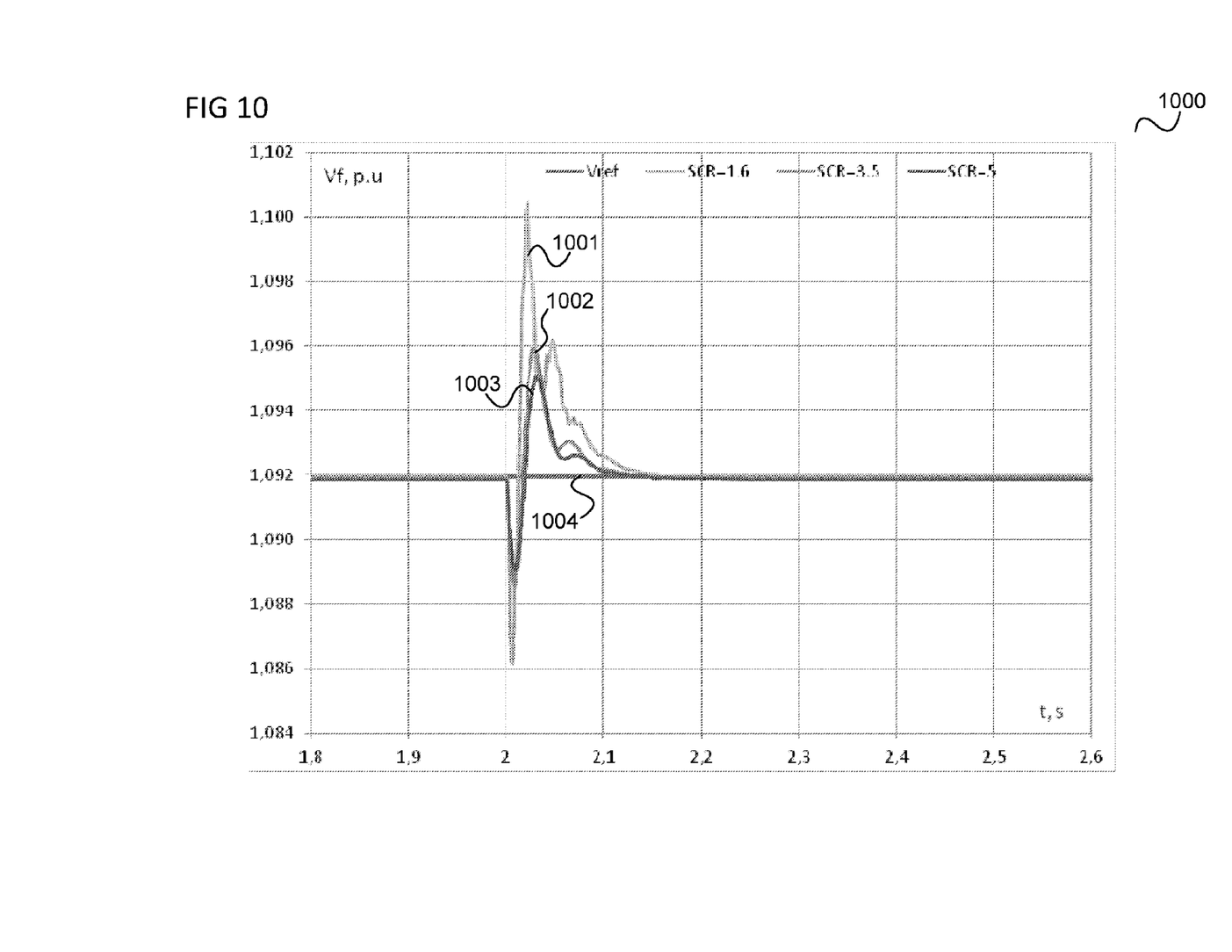
FIG. 10 shows a voltage diagram.

FIG. 10 shows a voltage diagram 1000.

The voltage diagram 1000 shows the voltage (in p.u.) over time at the low voltage side of the generator connection transformer 304 of a wind turbine generator 303. A first graph 1001 shows the voltage for an SCR (short circuit ratio) of 1.6, a second graph 1002 shows the voltage for an SCR (short circuit ratio) of 3.5 and a third graph 1003 shows the voltage for an SCR (short circuit ratio) of 5.0.

The example is based on a ratio of inductivity to resistance of the grid of 10. Further, the reference voltage is shown by a fourth graph 1004.

In this example, a disturbance at time t=2 leads to overvoltages which are quickly brought back to the level of the reference voltage such that the wind power plant is quickly in a stable condition.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A power generation system comprising
a wind power plant comprising a plurality of wind turbine generators; and
a power plant controller comprising a determiner configured to determine, in response to a disturbance in the wind power plant, respective voltage references for each of the plurality of wind turbine generators based on respective locations of the plurality of wind turbine generators within the wind power plant relative to a location of the disturbance, wherein the power plant controller is configured to signal, to the plurality of wind turbine generators, the respective voltage references to control output voltages of the plurality of wind turbine generators;
wherein each of the plurality of wind turbine generators comprises a controller configured to control the wind turbine generator based on one of the respective voltage references.

2. The power generation system according to claim 1, wherein the respective voltage references are different for each of the plurality of wind turbine generators.

3. The power generation system according to claim 1, wherein the determiner is configured to determine the respective voltage references based on reactive power references.

4. The power generation system according to claim 1, wherein the power plant controller is further configured to signal, to the plurality of the wind turbine generators, active power references to control active power output by the plurality of the wind turbine generators and wherein the controller of each of the plurality of wind turbine generators is further configured to control the wind turbine generator in accordance with one of the active power references.

5. The power generation system according to claim 1, wherein the controller of each of the plurality of wind turbine generators is configured to control output voltage of the wind turbine generator in accordance with one of the respective voltage references.

6. The power generation system according to claim 1, wherein the controller of each of the plurality of wind turbine generators is configured to close-loop control output voltage of the wind turbine generator in accordance with one of the respective voltage references.

7. The power generation system according to claim 1, wherein the controller of each of the plurality of wind turbine generators is configured to control the wind turbine generator by controlling a stator voltage of the wind turbine generator based on one of the respective voltage references.

8. The power generation system according to claim 1, wherein the controller of each of the plurality of wind turbine generators is configured to control the wind turbine generator independent from a reactive power output by the wind turbine generator.

9. The power generation system according to claim 1, wherein the controller of each of the plurality of wind turbine generators is configured to control the wind turbine generator independent from a reactive power reference.

10. A method for controlling wind turbine generators comprising:
in response to a disturbance in the wind power plant, determining respective voltage references for each of a plurality of wind turbine generators of a wind power plant based on respective locations of the plurality of wind turbine generators within the wind power plant relative to a location of the disturbance;
signaling, to the plurality of wind turbine generators, the respective voltage references to control output voltages of the plurality of wind turbine generators; and
controlling each of the plurality of the wind turbine generators based on the respective voltage reference signaled to the wind turbine generator.

11. A power plant controller comprising:
a determiner configured to determine, in response to a disturbance in the wind power plant, respective voltage references for each of a plurality of wind turbine generators of a wind power plant based on respective locations of the plurality of wind turbine generators within the wind power plant relative to a location of the disturbance; and
a transmitter configured to signal the respective voltage references to the plurality of turbine generators to control output voltages of the plurality of wind turbine generators.

* * * * *